(12) United States Patent  
Kröhnke et al.

(10) Patent No.: US 9,193,847 B2
(45) Date of Patent: Nov. 24, 2015

(54) POLYMER COMPOSITIONS WITH IMPROVED BARRIER PROPERTIES AGAINST THE PERMEATION OF OXYGEN

(75) Inventors: Christoph Kröhnke, München (DE); Csaba Kenyō, Farmos (HU); Károly Renner, Györzámoly (HU); Béla Pukánszky, Budapest (HU)

(73) Assignee: Clariant Production (France) S.A.S., Trosly Breuil (FR)

( * ) Notice: Subject to any disclaimer, the term of this patent is extended or adjusted under 35 U.S.C. 154(b) by 0 days.

(21) Appl. No.: 13/141,357

(22) PCT Filed: Nov. 25, 2009

(86) PCT No.: PCT/EP2009/065815
§ 371 (c)(1),
(2), (4) Date: Jul. 14, 2011

(87) PCT Pub. No.: WO2010/072501
PCT Pub. Date: Jul. 1, 2010

(65) Prior Publication Data
US 2011/0262673 A1    Oct. 27, 2011

(30) Foreign Application Priority Data

Dec. 24, 2008 (EP) .................... 08172890

(51) Int. Cl.
B32B 1/08 (2006.01)
C08K 5/3435 (2006.01)
C08K 5/34 (2006.01)

(52) U.S. Cl.
CPC ............. C08K 5/34 (2013.01); *C08K 2201/012* (2013.01); *Y10T 428/139* (2015.01); *Y10T 428/1352* (2015.01)

(58) Field of Classification Search
CPC ...... C08K 5/3435; C08K 5/3462; C08K 5/34; C08K 2201/012; Y10T 428/1352; Y10T 428/139
USPC .................... 524/99, 100, 102, 103
See application file for complete search history.

(56) References Cited

U.S. PATENT DOCUMENTS

| 3,634,320 A | 1/1972 | Metzner |
| 4,289,830 A | 9/1981 | Knott, II |
| 4,611,019 A | 9/1986 | Lutzmann et al. |

(Continued)

FOREIGN PATENT DOCUMENTS

JP    2006062170 A    9/2006

OTHER PUBLICATIONS

English translation of Notice of Reasons for Rejection, dated Dec. 12, 2012, with respect to Japanese Patent Application Serial No. 2011-542743.

*Primary Examiner* — Kriellion Sanders

(74) *Attorney, Agent, or Firm* — Anthony A. Bisulca

(57) ABSTRACT

The present invention relates to polymer compositions comprising (a) a polymer containing hydroxyl alkylene repeating units and (b) an additive selected from compounds of the formulae (1) to (6)

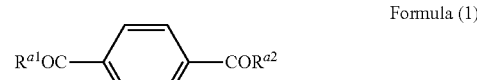

Formula (1)

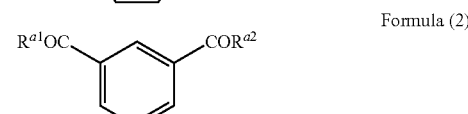

Formula (2)

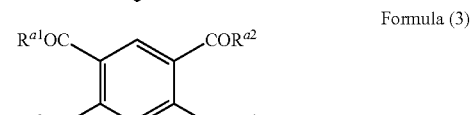

Formula (3)

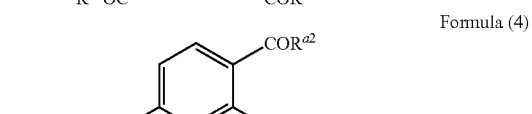

Formula (4)

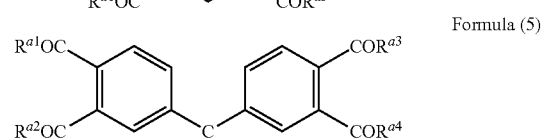

Formula (5)

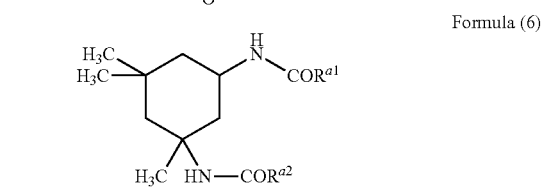

Formula (6)

wherein
$R^{a1}$, $R^{a2}$, $R^{a3}$ and $R^{a4}$ can be the same or different and independently represent a group selected from the moieties having formula (A) or formula (B),

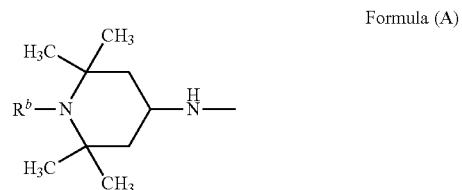
Formula (A)

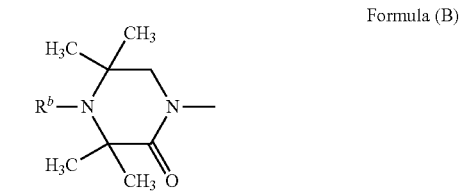

Formula (B)

wherein
$R^b$ is selected from hydrogen, $C_{1-6}$ alkyl, $C_{1-6}$ alkoxy and $-CO-C_{1-4}$ alkyl.

14 Claims, No Drawings

(56) References Cited

U.S. PATENT DOCUMENTS

| | | |
|---|---|---|
| 7,332,535 B2 | 2/2008 | Krohnke et al. |
| 2002/0022144 A1 | 2/2002 | Yang et al. |
| 2002/0198297 A1 | 12/2002 | Odorisio et al. |
| 2003/0234386 A1 | 12/2003 | Krohnke et al. |
| 2004/0058178 A1 | 3/2004 | Yang et al. |
| 2010/0028580 A1 | 2/2010 | Palmer et al. |

POLYMER COMPOSITIONS WITH IMPROVED BARRIER PROPERTIES AGAINST THE PERMEATION OF OXYGEN

FIELD OF THE INVENTION

The invention relates to polymer compositions comprising polymers containing hydroxy alkylene repeating units such as ethylene-vinyl alcohol copolymers (EVOH) and polyvinyl alcohol (PVOH) which have improved barrier properties against the permeation of oxygen.

BACKGROUND OF THE INVENTION

Polymer compositions comprising EVOH and/or PVOH have been commonly used in order to impart oxygen barrier properties to polymer compositions. Oxygen barrier properties reduce the oxygen permeation through said polymer composition. A reduced oxygen permeation is an important feature of polymer compositions to be used in the field of packaging materials, in particular in packaging materials used for packaging of goods prone to deterioration by the action of oxygen such as food products, pharmaceutical products, and products for diagnostic purposes.

One of the advantages of using polymers such as EVOH and/or PVOH instead of other materials imparting oxygen barrier properties such as thin metal foil or vapour-deposited layers of inorganic oxides is that polymer processing techniques such as extrusion, injection molding, film blowing etc. are available which allow to produce articles with closed, pin-hole-free surfaces. However, EVOH and PVOH suffer from the drawbacks of being water-sensitive. On the other hand, the use of thick layers in order to improve oxygen barrier properties is less favourable due to the high costs of the material and its opaque appearance. In order to maintain the oxygen barrier properties of an EVOH and/or PVOH film, it is usually necessary to coat or laminate said films with moisture-barrier materials such as polyolefins. Providing such moisture-barrier layers, i.e. manufacturing a multilayer film having an inner layer containing EVOH and/or PVOH, implies increased complexity of the manufacturing process. The individual layers of said multilayer film have to be assembled in such a manner that problems like a separation of the individual layers (delamination) during use of the film is prevented.

In order to accomplish this, it is necessary to select the polymers from which the moisture barrier layers are prepared such that no compatibility problems with EVOH and/or PVOH arises in order to avoid delamination. For this reason, polyolefins have been commonly used as moisture-barrier layers.

Furthermore, processing steps such as co-extrusion, heat-laminating etc. of the individual thin layers have to be applied which implies that more complex manufacturing equipment is required. Furthermore, providing a layer in a thickness sufficient to impart satisfactory moisture-barrier properties also implies an increase of the material costs besides technical constraints with respect to the multilayer film.

Hence, it is desirable to improve the oxygen barrier properties of polymers containing hydroxyl alkylene repeating units, in particular polymers containing hydroxyl ethylene repeating units such as EVOH or PVOH, in terms of their stability against moisture such that in comparison to commonly known barrier films the thickness of the moisture-barrier layers can be reduced. It is even more desirable to improve the oxygen barrier properties of the afore-mentioned polymers in terms of their stability against moisture to such an extent that no moisture-barrier layers are required.

US 2002/0022144 A1 and US 2004/0058178 A1 describe the concept of blocking the hydroxyl groups of an EVOH polymer in order to improve the oxygen barrier properties by reacting said hydroxyl groups with an aldehyde such that an acetyl moiety is formed. It is evident that carrying out said reaction involves additional time and efforts, in particular as the reaction is carried out by either dissolving or suspending the EVOH copolymer, said aldehyde and a catalyst in an appropriate solvent such as acetic acid, water, ethanol or a mixture thereof, which solvent has to be removed after completion of the reaction. Said procedure requires time, reaction equipment and the supply of materials such as said aldehyde and solvents. Furthermore, dissolving the polymeric material in a concentration sufficiently high in order to ensure a satisfactory reaction rate and the subsequent removal of the solvents can be cumbersome.

The object of the present invention is to improve the oxygen barrier properties of polymers containing hydroxyl alkylene repeating units, in particular polymers containing hydroxyl ethylene repeating units such as EVOH or PVOH, in a simple and efficient manner.

Said object is accomplished in the manner described herein below.

DESCRIPTION OF THE INVENTION

Surprisingly, it was found that the object of the invention can be achieved by providing a composition comprising (a) a polymer containing hydroxyl alkylene repeating units in an amount of at least 10% relative to the total number of repeating units present in the polymer (a)

and (b) 0.1 to 5% by weight relative to said polymer (a) of at least one additive selected from the compounds represented by the following formulae (1) to (6)

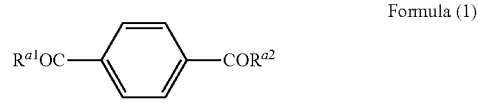

Formula (1)

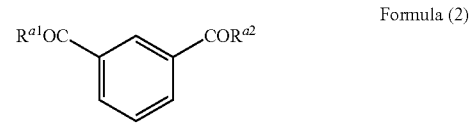

Formula (2)

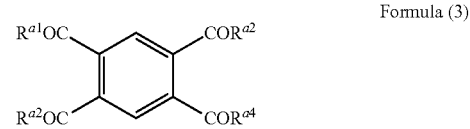

Formula (3)

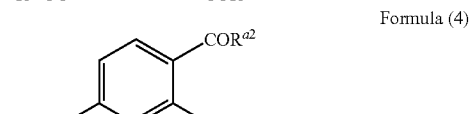

Formula (4)

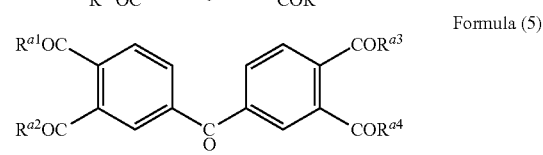

Formula (5)

-continued

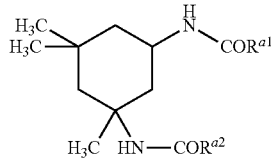

Formula (6)

wherein
$R^{a1}$, $R^{a2}$, $R^{a3}$ and $R^{a4}$ can be the same or different and independently represent a group selected from the moieties having formula (A) or formula (B),

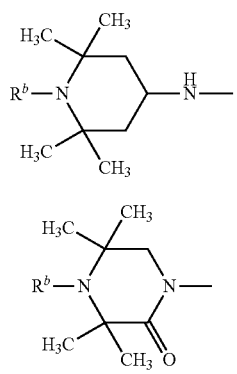

Formula (A)

Formula (B)

wherein
$R^b$ is selected from hydrogen, $C_{1-6}$ alkyl, $C_{1-6}$ alkoxy and —CO—$C_{1-4}$ alkyl.

In the following, the components of said composition of the present invention will be explained in more detail.

Polymer Containing Hydroxyl Alkylene Repeating Units

Polymer (a) as present in the composition according to the present invention is characterised in that it contains hydroxyl alkylene repeating units. Said hydroxyl alkylene repeating units can be hydroxyl ethylene, 1-hydroxyl propylene, and 1-hydroxyl n-butylene.

Said hydroxyl alkylene repeating units can be of a single type or several types of hydroxyl alkylene repeating units can be present.

Polymer (a) as present in the composition according to the present invention can have various general constitutions:
(i) It can exclusively consist of one type of hydroxyl alkylene repeating units.
(ii) It can consist of two or more types of hydroxyl alkylene repeating units.
(iii) It can consist of one type of hydroxyl alkylene repeating units and repeating units of at least one type other than hydroxyl alkylene repeating units.
(iv) It can consist of two or more types of hydroxyl alkylene repeating units and repeating units of at least one type other than hydroxyl alkylene repeating units.

The number of hydroxyl alkylene repeating units relative to the total number of repeating units present in the polymer (a) used in the present invention can generally vary over a broad range. However, the presence of hydroxyl alkylene repeating units is of importance for the oxygen barrier properties of the polymer. Therefore, it is essential that a specific minimum content of the hydroxyl alkylene repeating units is present in the polymer in order to impart oxygen barrier properties to the composition of the present invention.

When a repeating unit of a type other than hydroxyl alkylene repeating units is contained in polymer (a), the lower limit for the number of hydroxyl alkylene repeating units in polymer (a) generally is 10% relative to the total number of repeating units present in the polymer. Preferably, it is 15%, more preferably it is 30%, even more preferably it is 50% and most preferably it is 70%.

Said repeating unit other than a hydroxyl alkylene repeating unit can be for example ethylene, n-propylene, i-propylene, 2-methylpropylene, n-butylene, and i-butylene.

In a preferred embodiment, said repeating unit is ethylene.

In a more preferred embodiment, said repeating unit is ethylene and is combined with hydroxyl ethylene as the hydroxyl alkylene repeating unit.

In a most preferred embodiment, the composition comprises as said polymer (a) ethylene-hydroxyl ethylene copolymer, to which it is also referred as ethylene-vinyl alcohol copolymer (EVOH), wherein the content of hydroxyl ethylene repeating units is in the range of 10% to less than 100%, preferably in a range of 15% to less than 100%, more preferred in a range of from 30% to less than 100%, even more preferably in a range of from 50% to less than 100%, still more preferably in a range of from 65% to less than 100% and most preferably in a range from 75% to less than 100%.

In another preferred embodiment, no repeating unit of a type other than a specific hydroxyl alkylene repeating unit is contained in polymer (a) such that the content of said hydroxyl alkylene repeating unit is 100% and the polymer is hence a homopolymer.

In a particularly preferred embodiment, no repeating unit of a type other than hydroxyl ethylene repeating units is contained in polymer (a), i.e. only hydroxyl ethylene repeating units are present in polymer (a) and the polymer is hence a homopolymer such that the content of hydroxyl ethylene repeating units is 100%. In this case, the polymer can also be referred to as polyvinyl alcohol (PVOH).

Polymer (a) is not particularly limited with respect to its molecular weight as long as the polymer is suitable for the intended purpose of the composition, i.e. for instance for the formation of films. This implies that the molecular weight has to be in such a range that dimensional stability of the composition under the conditions of the intended use is ensured.

Additive

In the present invention, a suitable additive is any compound having a substructure resulting from a combination of a moiety represented by one of the above formulae (1) to (6) with a moiety $R^a$ as represented by formulae (A) or (B).

In the relation to said formulae (1) to (6), a $C_{1-6}$ alkyl group as represented by $R^b$ is a group selected from methyl, ethyl, n-propyl, i-propyl, n-butyl, i-butyl, sec-butyl, tert-butyl, n-pentyl, 1-methylbutyl, 2-methylbutyl, 3-methylbutyl, 1,1-dimethylpropyl, 1,2-dimethylpropyl, 2,2-dimethylpropyl, n-hexyl, 1-methylpentyl, 2-methylpentyl, 3-methylpentyl, 4-methylpentyl, 1,1-dimethylbutyl, 1,2-dimethylbutyl, 1,3-dimethylbutyl, 2,3-dimethylbutyl, 2,2-dimethylbutyl, 3,3-dimethylbutyl, 1-ethylbutyl, 2-ethylbutyl, 1-ethyl-2-methylpropyl, 1,1,2-trimethylpropyl, and 1,2,2-trimethylpropyl.

A $C_{1-6}$ alkoxy group as represented by $R^b$ is a $C_{1-6}$ alkyl group as described hereinabove that is linked to the nitrogen atom of the moiety represented by $R^a$ by means of an oxygen atom.

A —CO—$C_{1-4}$ alkyl group as represented by $R^b$ is a $C_{1-4}$ alkyl group as described hereinabove that is linked to the nitrogen atom of the moiety represented by $R^a$ by means of a —CO— group.

In a preferred embodiment of the present invention, the additive is a compound containing the substructure represented by above formula (1) or (2), wherein $R^{a1}$ and $R^{a2}$ independently are a moiety selected from above formula (A) and (B), wherein $R^b$ is selected from hydrogen, methyl, ethyl, CHO—, methyl-CO—, and ethyl-CO—.

In a more preferred embodiment, the additive is a compound containing the substructure represented by above formula (2), wherein $R^{a1}$ and $R^{a2}$ both are a moiety represented by above formula (A), wherein $R^b$ is selected from hydrogen, methyl, ethyl, CHO—, methyl-CO—, and ethyl-CO—.

A particularly preferred additive is a compound containing the substructure represented by above formula (2), wherein $R^{a1}$ and $R^{a2}$ both are a moiety represented by above formula (A), wherein $R^b$ is hydrogen, i.e. N,N'-bis(2,2,6,6-tetramethyl-4-piperidyl)-1,3-benzenedicarboxamide (formula 7). Said additive is available under the trade name Nylostab®-SEED® from Clariant.

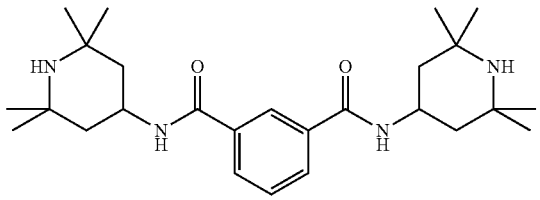

Formula 7

Generally, the additive can be contained in an amount ranging from 0.1 to 5', by weight, relative to the amount of polymer (a).

Preferably, the additive can be contained in an amount ranging from 0.15 to 3% by weight. More preferably, the additive is contained in an amount ranging from 0.2 to 2% by weight. Most preferably, the additive is contained in an amount ranging from 0.3 to 0.5% by weight.

In a preferred embodiment of the present invention, the composition comprises EVOH as said polymer (a) and the additive represented by above formula (7), wherein the content of hydroxyl ethylene repeating units is as described hereinabove.

In another preferred embodiment of the present invention, the composition comprises PVOH as said polymer (a) and the additive represented by above formula (7).

The composition of the present invention may further comprise common additives such as stabilizers against thermooxidative and light-induced degradation, UV-absorbers, fillers like mica, processing additives, colorants, clay-based additives ("nanocomposites") in amount of 0.005 to 5% by weight, relative to said polymer (a).

Method for Preparing the Composition According to the Present Invention

The composition of the present invention can be prepared by any conventional polymer blending technique such as mixing in an extruder or static mixer, preferably in a high speed mixer. The conditions of blending such as temperature and the settings of any mixing means such as the configuration of an extruder, e.g. barrel length, length to diameter ratio, temperature profile, screw settings etc., are selected in accordance with the components to be blended, i.e. the settings required for blending said polymer and said additive.

In the case where the composition comprises EVOH or PVOH as said polymer (a) and a compound of above formula (7) as said additive, it is also preferred to use a high-output twin screw extruder at barrel temperatures in a range from 260 to 280° C.

Packaging Material

The composition according to the present invention can be processed into packaging materials such as films, bags, pouches, tubes, cylinders, bottles, canisters etc. wherein the particular shape of the material is appropriately selected depending on the intended purpose of the goods to be packaged.

The composition of the present invention is particularly useful for packaging goods that are prone to a deterioration of desirable properties under the action of oxygen. In this respect, pharmaceuticals or diagnostics can be mentioned which are usually packaged in cylinders, bottles, pouches, canister etc.

Furthermore, food can be mentioned which is usually packaged in films, bags and pouches.

Depending on the conditions of the intended use, the packaging material can comprise an essentially continuous layer of the composition according to the present invention which is laminated on one or both sides with one or more layers of a different material in order to impart desirable properties to the composite. For instance, a layer of a polyolefin can be provided on one or both sides of said layer as a moisture barrier layer in order to provide supplementary protection against moisture. In comparison to conventional oxygen barrier layers containing EVOH and/or PVOH, any layer providing for supplementary protection against moisture can have a significantly lower thickness.

The provision of a layer for supplementary protection against moisture can be contemplated in particular if the packaging material is to be used in an environment of high humidity. For instance, some foods such as raw meat, fish, vegetables, fruits and the like will lead to an atmosphere within the packaging material that has a high humidity content or is even saturated in humidity.

When the packaging material is to be used for packaging pharmaceuticals or diagnostics, in particular if said goods are in solid form, the humidity content of the atmosphere within the packaging material will usually be remote from saturation. In this case, an additional moisture barrier layer might not be necessary. Nevertheless, one or more additional layers can be provided, for instance in order to provide for desirable mechanical properties.

Method for Preparing the Said Packaging Material

The above-described packaging material can be prepared by standard polymer engineering techniques commonly employed for imparting a shape to thermoplastic polymer compositions. Such techniques include blow-moulding, injection moulding, for instance in order to form canisters, containers, bottles, tubes cylinders etc. If a layer of the composition according to the present invention is to laminated on one or both sides with another layer of a thermoplastic polymer composition, techniques such as co-injection or co-moulding could be employed.

Packaging materials such as films, bags, pouches etc. can be prepared by techniques such as blow-moulding, extruding and melt-stretching, rolling or calendaring in a unidirectional or bidirectional manner.

Examples

In the following, the present invention is illustrated by means of examples.

Granular EVOH (EVAL F 101 B, available from EVAL Europe, a subsidiary company of Kuraray Co., Ltd.) having a content of ethylene repeating units of 32% was dried at 100° C. for 4 hours. Then the dried EVOH was mechanically mixed with Nylostab® S-EED® powder (tradename, available from Clariant) using a twin screw extruder type Brabender Plasticorder DSK 42/7 at a temperature of 280° C. and a screw speed of 50 rpm. Thus, granular compositions having different concentrations of Nylostab® S-EED® as indicated in Table 1 hereinbelow were prepared which were dried again at 100° C. for 4 hours. From the obtained compositions plaques having a thickness of 1 mm were prepared by compression molding at a temperature of 280° C.

These plaque samples were stored for 3 days at ambient temperature of 22° C. and 50% relative humidity. Subsequently, oxygen permeability of each of the plaques was determined.

Oxygen permeability was determined by means of the Systec method at 22° C. and 60% relative humidity as described by K. G. Gatos, L. Százdi, B. Pukánsky, J. Karger-Kocsis in Macromolecular Rapid Communications, 2005, vol. 26(11), page 915 ("Controlling the De-Intercalation in Hydrogenated Nitrile Rubber (HNBR)/Organo-Montmorrilionite Nanocomposites by Curing with Peroxide").

TABLE 1

| concentration of Nylostab S-EED [% by weight] | Oxygen permeation absolute [cm³/m²/day] | relative % |
|---|---|---|
| 0.0 | 42.4 | 100.0 |
| 0.1 | 27.1 | 63.9 |
| 0.2 | 4.47 | 10.5 |
| 0.3 | 4.52 | 10.7 |
| 0.5 | 5.72 | 13.5 |
| 0.8 | 3.99 | 9.4 |

The above results show a clear decrease of the oxygen permeability of EVOH by the addition of Nylostab® S-EED® at a concentration as low as 0.1% by weight.

The invention claimed is:

1. A polymer composition consisting of:
   (a) a polymer selected from: polyvinyl alcohol and an ethylene-vinyl alcohol copolymer consisting of ethylene and hydroxyl ethylene repeating units, the polymer comprising hydroxyl ethylene-repeating units in ethylene-vinyl alcohol copolymer are present in the polymer in an amount of at least 50% relative to the total number of repeating units present in the polymer,
   (b) 0.2 to 2% by weight relative to said polymer (a) of at least one additive selected from the group consisting of compounds represented by the following formulae (1) to (6)

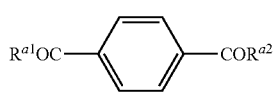

Formula (1)

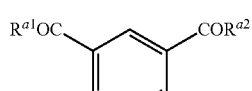

Formula (2)

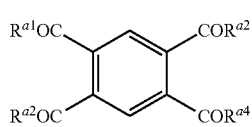

Formula (3)

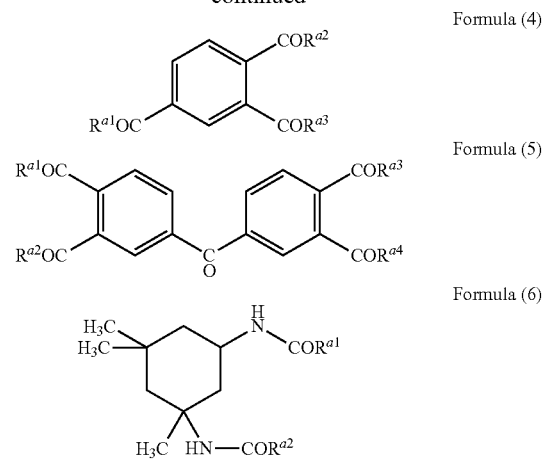

Formula (4)

Formula (5)

Formula (6)

wherein
$R^{a1}$, $R^{a2}$, $R^{a3}$ and $R^{a4}$ can be the same or different and independently represent a group selected from the moieties having formula (A) or formula (B),

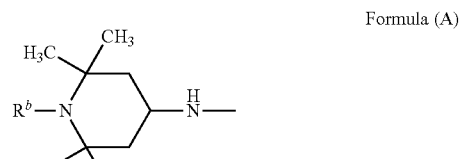

Formula (A)

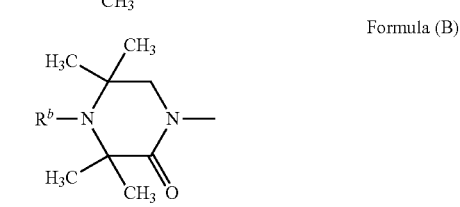

Formula (B)

wherein
$R^b$ is selected from the group consisting of hydrogen, $C_{1-6}$ alkyl, $C_{1-6}$ alkoxy, —CO—$C_{1-4}$ alkyl and combinations thereof; and
   (c) optionally 0.005 to 5% by weight, relative to said polymer (a) of additives selected from the group consisting of stabilizers against thermooxidative and light-induced degradation, fillers, processing additives, colorants and clay-based additives.

2. The composition according to claim 1, wherein the polymer (a) comprises hydroxyl ethylene repeating units in an amount of at least 65% relative to the total number of repeating units present in the polymer (a).

3. The composition according to claim 1, wherein said polymer (a) is an ethylene-vinyl alcohol copolymer.

4. The composition according to claim 3, wherein the polymer (a) is an ethylene-vinyl alcohol copolymer comprising hydroxyl ethylene repeating units in an amount in the range of 75% to less than 100% relative to the total number of repeating units present in the polymer (a).

5. The composition according to claim 1, wherein the polymer (a) is polyvinyl alcohol.

6. The composition according to claim 1, wherein said additive is a compound represented by formula (1) or (2), wherein both $R^{a1}$ and $R^{a2}$ represent a moiety having formula (A).

7. The composition according to claim 6, wherein said additive comprises N,N'-bis(2,2,6,6-tetramethyl-4-piperidyl)-1,3-benzenedicarboxamide as represented by the following formula

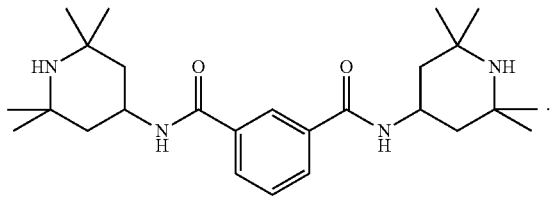

8. The composition according to claim 1, wherein said additive (b) is present in an amount of 0.3-0.5% by weight relative to said polymer (a).

9. A packaging material comprising a composition according to claim 1.

10. A packaging material according to claim 9 in a form selected from the group consisting of a film, bag, pouch, tube, cylinder, bottle, and canister.

11. The composition according to claim 1, wherein the composition has absolute oxygen permeability of less than about 27.1 $cm^3/m^2$/day when measured under pure oxygen at 22° C. and 60% relative humidity.

12. The composition according to claim 1, wherein the composition has relative oxygen permeability of less than about 63.9% as compared to an identical material lacking the additive (b) when measured under pure oxygen at 22° C. and 60% relative humidity.

13. The composition according to claim 1, wherein the at least one additive (b) is present in an amount of 0.1 to 0.8% by weight relative to the polymer (a).

14. The composition according to claim 3, wherein the polymer (a) comprises hydroxyl ethylene repeating units in an amount in the range of 65% to less than 100% relative to the total number of repeating units present in the polymer (a).

* * * * *